United States Patent [19]

Daino

[11] Patent Number: 5,121,468

[45] Date of Patent: Jun. 9, 1992

[54] PRINTER IMAGE CONTROL SYSTEM

[75] Inventor: Tomohiro Daino, Kanagawa, Japan

[73] Assignee: Fuji Xerox Co., Ltd., Tokyo, Japan

[21] Appl. No.: 595,807

[22] Filed: Oct. 10, 1990

[51] Int. Cl.[5] .............................................. G06K 15/00
[52] U.S. Cl. ..................................... 395/102; 395/114
[58] Field of Search ............................... 364/518–520, 364/235 MS, 930 MS; 355/308–311; 346/136, 134; 395/101, 102, 114, 115

[56] References Cited

U.S. PATENT DOCUMENTS 4,965,580 10/1990 Yamazaki ............................ 346/136
4,996,650  2/1991 Kenbo ................................. 364/510

Primary Examiner—Arthur G. Evans
Attorney, Agent, or Firm—Finnegan, Henderson, Farabow, Garrett & Dunner

[57] ABSTRACT

In a printer image control system, which temporarily holds an image signal which is to be transmitted to a printer and also controls the printer, an image effective area is determined according to the size of a printing sheet, so that nothing is printed outside the image effective area. Also "white" data can be printed over an unwanted image region of the image signal, to remove the unwanted image region; or when the image signal falls partially outside of the image effective area, the image signal can be contracted to fit on one page or it can be divided to be printed on two pages.

10 Claims, 8 Drawing Sheets

FIG. 1
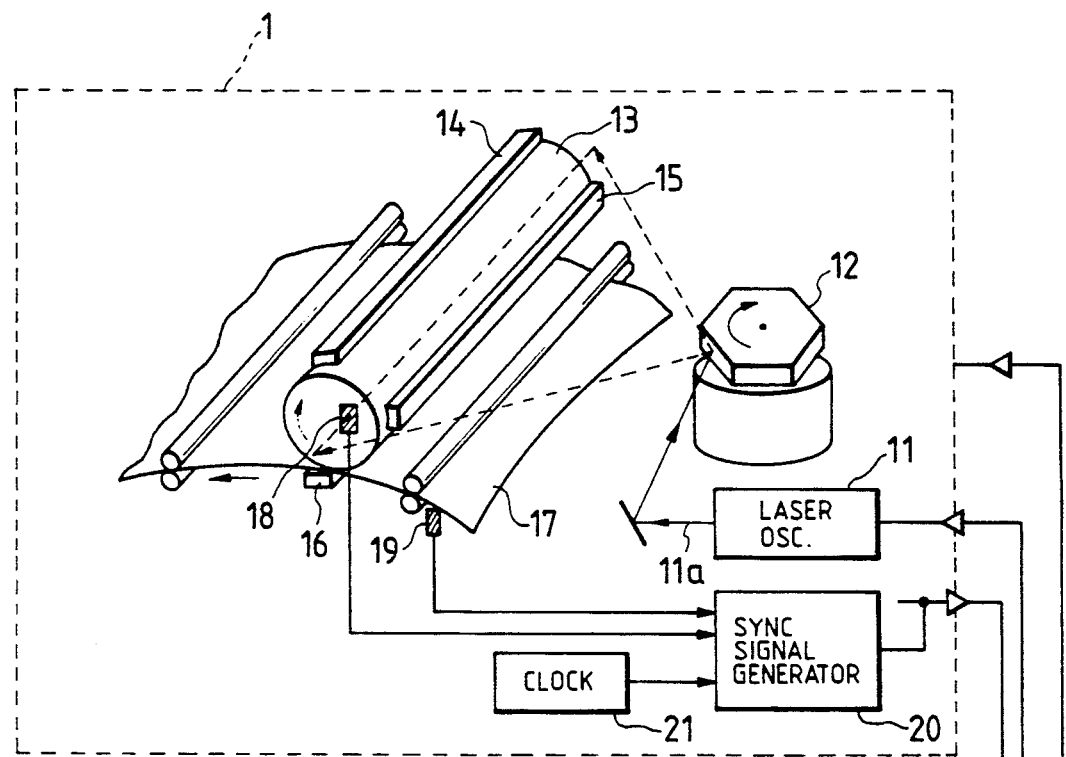
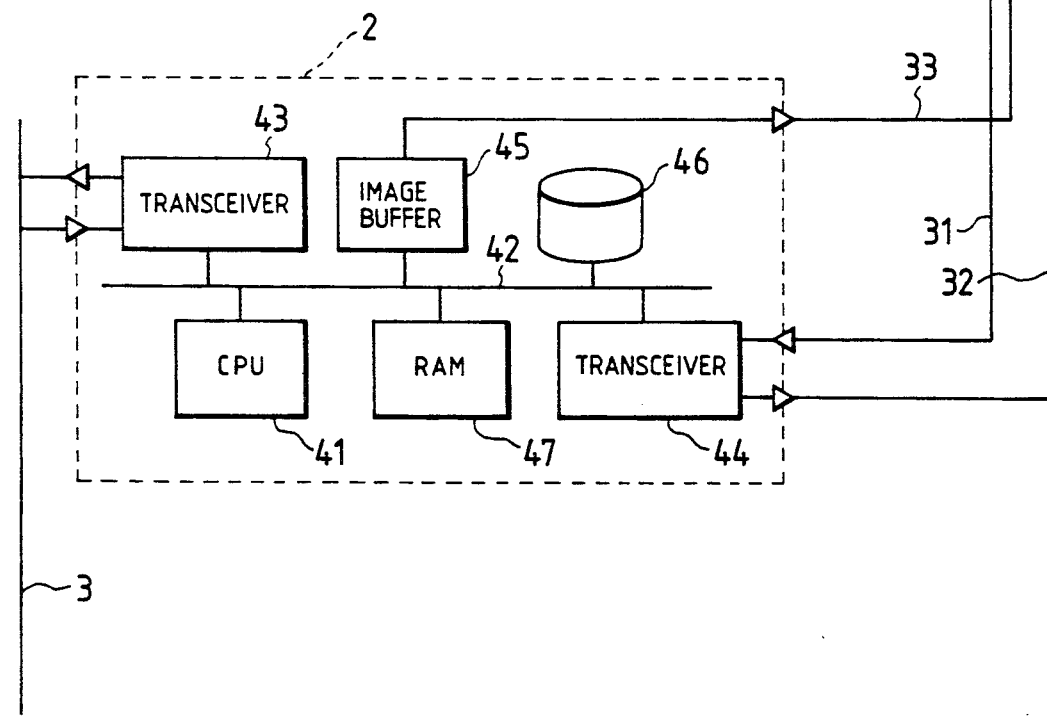

| PAPER SIZE | IMAGE EFFECTIVE WIDTH | | | |
|---|---|---|---|---|
| | x | x' | y | y' |
| A1 | $x_1$ | $x'_1$ | $y_1$ | $y'_1$ |
| A2 | $x_2$ | $x'_2$ | $y_2$ | $y'_2$ |
| A3 | $x_3$ | $x'_3$ | $y_3$ | $y'_3$ |
| | | | | |
| B3 | | | | |
| B4 | | | | |
| B5 | | | | | ns
PRINTER IMAGE CONTROL SYSTEM

BACKGROUND OF THE INVENTION

1. Field of the Invention

This invention relates to printer image control systems, and more particularly to an improvement of a printer image control system to remove unwanted images.

2. Discussion of the Related Art

In a printing operation with a print server connected to a network, sometimes it is necessary to delete unwanted or unnecessary parts of the image. Also, it is sometimes required to print a selected part of an image generated from certain image data in an area smaller than that of the image. For instance, as shown in FIG. 12, it may be required to print only a partial area of the image "C" of image data 101 of size A3 (JIS: Japanese Industrial Standard) on a sheet 102 of size A4. In this case, the image "C" is printed on the sheet 102 as shown; that is, it covers the entire area of the sheet 102 but is dim in the peripheral portion. Therefore, it is necessary to delete the dim portion of the image if a clear printing is to be achieved.

In addition, in the case where image data is supplied to a print server from a work station connected to a network, sometimes it is required to print the image data except for some predetermined part. For instance in FIG. 13, where image data 103a displayed at a work station screen 103 is transmitted through a network to a printer control unit, it sometimes is required to print the image data except for an unwanted part 103b.

Furthermore, in printing image data when the image has a certain size, it sometimes is required to shift the image in its entirety, for instance, to the right in order to provide a binding margin for the printing sheet. As shown in FIG. 14, image 105 is shifted to the right on the printing sheet to provide a binding margin 107 on the left side. In such a case, heretofore, the image data is merely shifted to the right before being printed.

The above-described prior art suffers from the following problems:

(1) In the case depicted in FIG. 12, the printed image "C" covers the entire area of the sheet 102, but is dim in the peripheral portions.

(2) In the case depicted in FIG. 13, the unwanted image 103b may be deleted at the work station; however, the deletion of the unwanted image is time consuming and may damage the contents of the file. It is therefore desirable that the deletion of the unwanted image be carried out using the printer control unit; however, heretofore, it has not been possible to do so.

(3) In the case depicted in FIG. 14, the right side portion of the image is truncated; that is, not all the image data is printed out, and accordingly the intended image is not completely printed.

SUMMARY OF THE INVENTION

In view of the foregoing, a first object of this invention is to provide a printer image control system that can readily remove an unwanted image without the above-described difficulties while eliminating the more time consuming and expensive conventional techniques used before.

A second object of the invention is to provide a printer image control system that allows a shifted image to be contracted and printed on a single sheet or divided to be printed on two sheets.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the printer image control system of this invention includes means for determining the effective image area data based on the size of the printing sheet, means for generating image data which is within the effective image area, means for preventing the generation of image data not within the effective image area, and means responsive to the generating means for printing only the image data within the effective image area.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention. In the drawings:

FIG. 1 is an explanatory schematic diagram outlining the arrangement of a print server;

DETAILED DESCRIPTION OF THE INVENTION

Figures 2, 3:
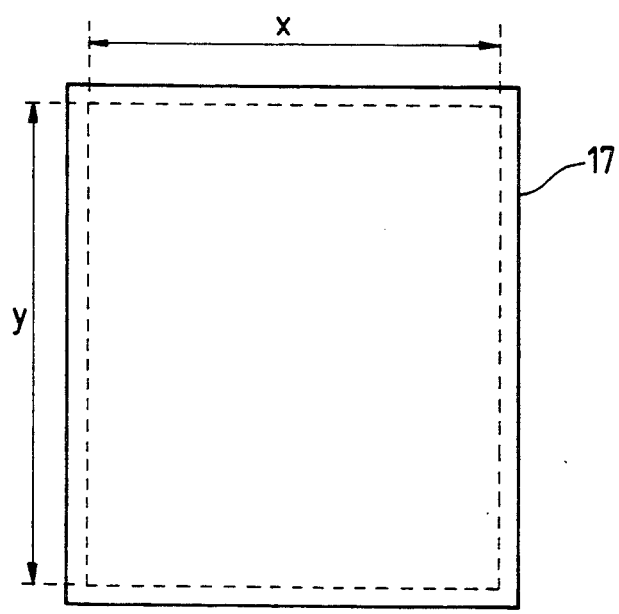
FIG. 2 is a diagram showing one example of an image effective width table.
FIG. 3 is an explanatory diagram for describing an image effective width.

Preferred embodiments of the invention will be described with reference to the accompanying drawings.

FIG. 1 shows a first preferred embodiment of the invention. The image processing system shown includes a raster scan type printer 1, such as a laser printer, and a printer control unit 2 through which the printer 1 is connected to a network 3. The printer 1 comprises a laser oscillator 11, a polygonal mirror 12 for deflecting an incident laser beam in a scanning mode, and a photoreceptor 13 on which a latent electrostatic image is formed by the laser beam. The laser oscillator 11 outputs a laser beam 11a which is modulated with an input image signal.

Provided around the photoreceptor 13 are a charging corotron 14 for charging the photoreceptor 13 uniformly, a developing unit 15 for developing the latent electrostatic image, and a transferring corotron 16 for transferring the developed image onto a sheet 17. A scan start detecting sensor 18 for detecting the start of the scan of the laser beam is provided at one end of the photoreceptor 13. A sheet supply start detecting sensor 19 for detecting the start of the supply of a sheet 17 is provided at a suitable position that is above or below a sheet conveying path and upstream of the transferring corotron 16 (for instance, near the register rollers).

The output signals of sensors 18 and 19 are applied to a synchronizing signal generator 20. The synchronizing signal generator 20 generates a line synchronizing signal in response to the detection signal of the scan start detecting sensor 18, and a page synchronizing signal in response to the detection signal of the sheet supply start detecting sensor 19. The synchronizing signals and a video clock signal are applied to the printer control unit 1 through a line 31. Line 31 is further used to transmit the status data of the printer 1 to the printer control unit 2.

The printer control unit 2 comprises a CPU 41 for performing the control functions for the printer. The CPU 41 is connected through a data bus 42 to a transceiver 43 on the network side, a transceiver 44 on the printer side, an image buffer 45, a magnetic disk 46, and a RAM 47.

A variety of commands outputted by the printer control unit 2 are supplied to the printer 1 through a command line 32. The image buffer 45 applies an image signal to the printer through an image line 33.

In this image processing system, the transceiver 43 on the network side receives various data, such as control data and print data, for the printer 1 from the network 3. When a print request command is issued, the printer control unit 2 receives it through the transceiver 43, so that the print data is stored in the RAM 47. The CPU 41 utilizes conversion data stored in the magnetic disk 46 to convert the print data into an image signal. The converted image signal is stored in the image buffer 45. Next, the CPU 41 detects the status of the printer 1 from the status data received through the transceiver 44. When it is determined that the printer 1 is ready for printing, the CPU 41 causes the image buffer 45 to transmit the image signal to the printer 1 through the image line 33.

Figure 4A:
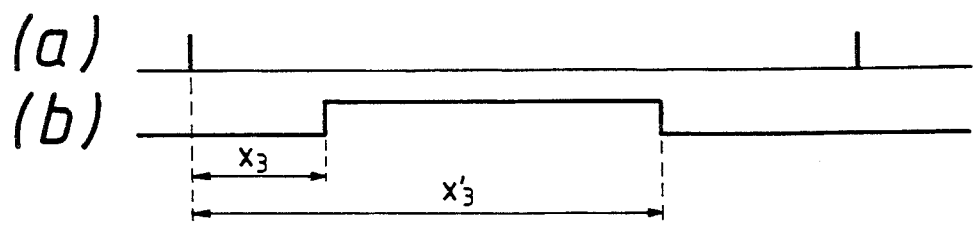
FIGS. 4(a) and 4(b) are time charts for explaining the operation of the present invention.

As here embodied, an image effective width table as shown in FIG. 2 has been stored in the RAM 47 or the magnetic disk 46. The image effective width and length in the table defines the effective area (x,y) of a printing sheet 17, as shown in FIG. 3. The table has image effective widths and lengths which correspond to respective sheet sizes. Data to be supplied in the x or horizontal direction is determined by the line synchronizing signal (a) supplied from the printer 1 as shown in FIG. 4(A). For instance, in the case of size A3, the effective width is x3'-x3 as shown in the part (b) of FIG. 4(A). In practice, the effective width is obtained by counting clock pulses from the occurrence of the line synchronizing signal (a).

Figure 4B:
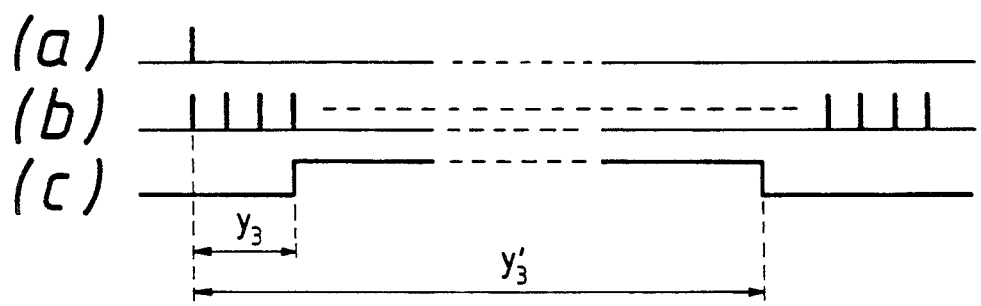

Similarly, data in the y or feed direction is determined with reference to the page synchronizing signal (a) of FIG. 4(B) supplied from the printer 1. For instance in the case of size A3, the effective length is y3'-y3 as shown in part (c) of FIG. 4(B). In practice, the effective length is obtained by counting the line synchronizing signal (b) from the occurrence of the page synchronizing signal (a) in FIG. 4(B).

In reading the image signal from the image buffer 45, the CPU 41 detects the size of a sheet from the status data of the printer or the control data supplied through the network 3, and refers to the above-described image effective width table according to the printing sheet size thus detected. Then, the CPU 41 reads the predetermined image effective width and length data, to obtain an effective width in the x direction using the line synchronizing signal (a) of FIG. 4(A) and an effective length in the direction of feed with reference to the page synchronizing signal (a) of FIG. 4(B). A logical product AND is obtained from the effective width and length to provide a read enable signal for the image buffer 45.

Figure 5:
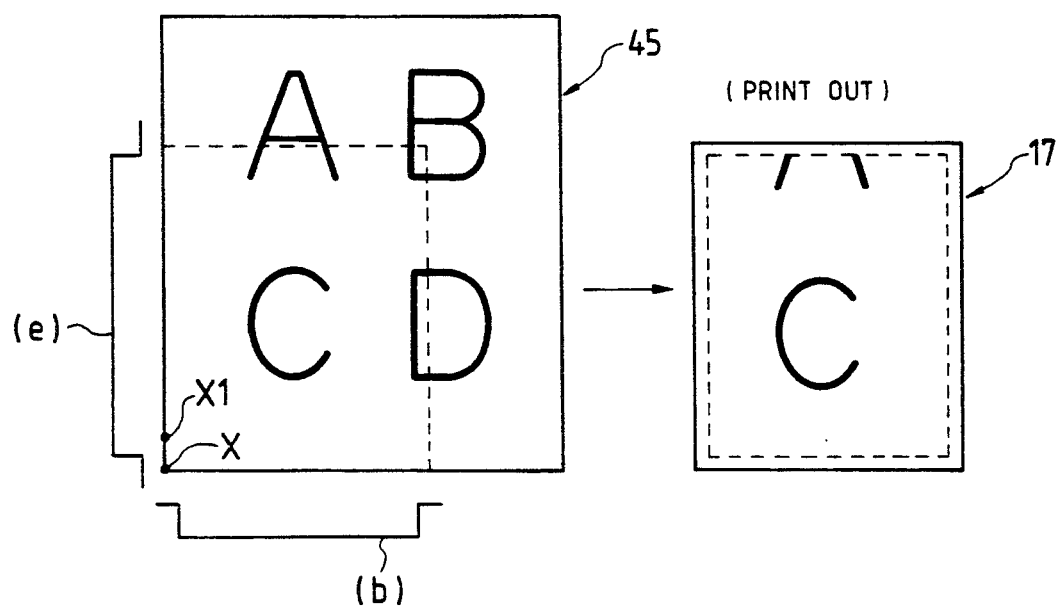
FIG. 5 is an explanatory diagram showing one example of printing provided by a first embodiment of this invention.

This system operates in the following manner. An image as shown in FIG. 5 is stored as image data in the image buffer 45. Referring to FIG. 4(A), in synchronization with the line synchronizing signal (a), the image buffer 45 is addressed regarding data in the x direction and in response to the next line synchronizing signal (a); it is again addressed in the x direction moving down from line to line from the top. However, the image signal on the addressed line is not read until the read enable signal (c) of FIG. 4(B) in the y direction of feed enables reading. Thereafter, as long as the read enable signal (b) of FIG. 4(A) in the x direction enables reading, the image signal is read out of the image buffer 45, and is supplied through the image line 33 to the laser oscillator 11 in the printer 1.

The above-described operations are carried out successively for all the lines in the image buffer 45. When the read enable signal (c) of FIG. 4(B) in the y direction of feed disables the reading, upon reaching the bottom of the effective area, then the reading of the image signal from the image buffer 45 is ended.

Thus, the image signal is read only while both read enable signals ((b) of FIG. 4(A) and (c) of FIG. 4(B)) are supplied to the laser oscillator 11, thereby allowing a laser beam 11a which is modulated with the image signals to be generated. The laser beam 11a is deflected by the polygonal mirror 12 in a scanning mode, so as to be applied to the photoreceptor 12 in the longitudinal x direction. As a result, the latent image of the image signal is formed on the photoreceptor 13 in the range of x'-x responsive to the scan start detecting sensor 18. At the same time, in the direction of feed of the printing sheet 17, the latent image of the image signal is formed in the range of the above-described image effective width y'-y.

The latent image is developed with the developing unit 15, and the developed image is transferred onto the sheet 17 and then fixed. As a result, the image is clearly printed only in the image effective area of the sheet 17 as indicated by the dotted line in FIG. 5.

Figure 6:
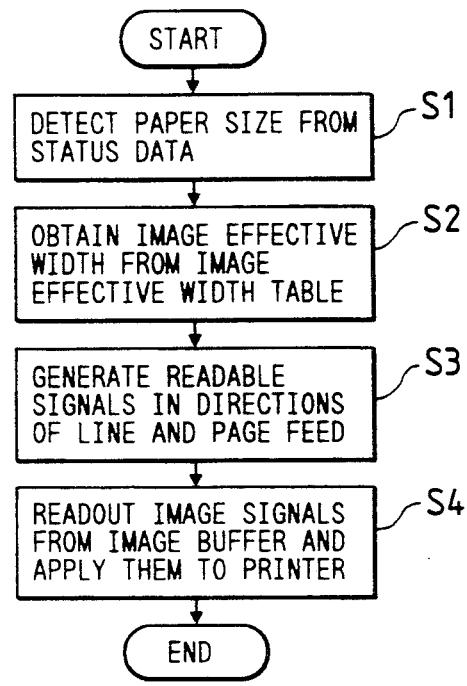
FIG. 6 is a flow chart describing the operation of the first embodiment.

FIG. 6 is a flow chart showing the functions of the CPU 41. The CPU 41 detects a sheet size from the status data received through the line 31 (Step S1), and, in response to the sheet size thus detected, refers to the image effective width table to obtain a suitable image effective width and length (Step S2). Thereafter, the CPU 41 forms the read enable signal in the x direction and the read enable signal in the y direction of feed (Step S3), whereby the image signals are read from the image buffer and applied to the printer (Step S4).

In this first embodiment, both the read enable signal (b) of FIG. 4(A) in the x direction and the read enable signal (c) of FIG. 4(B) in the direction of feed are utilized for reading the image signals from the image buffer 45. However, the read enable signals are also applied to the printer 1 so that the image signals applied to the laser oscillator 11 are controlled according to the two read enable signals.

Now, a printer image control system, according to a second embodiment of the invention, will be described. In the second embodiment, a "white" image is recorded in an unwanted area to erase any image in the unwanted area.

Figure 7:
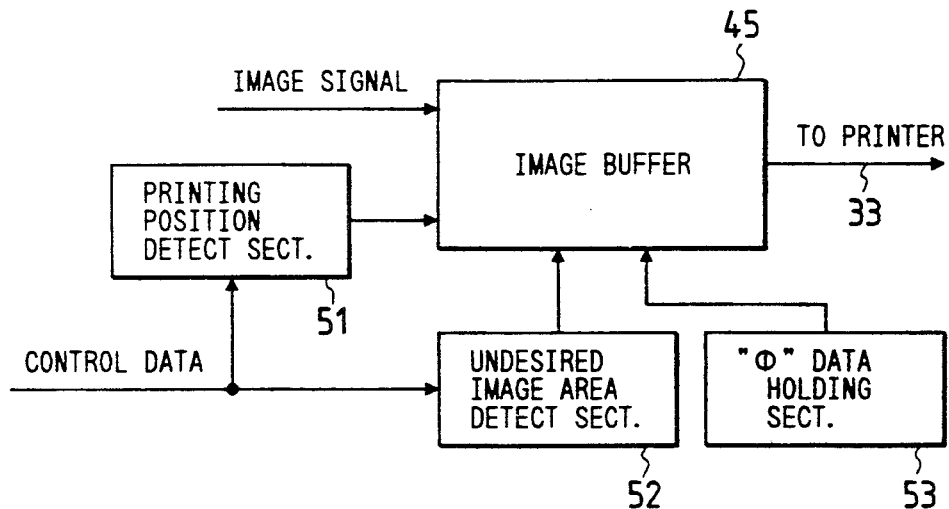
FIG. 7 is a block diagram explaining the functions of a second embodiment of the present invention.

FIG. 7 (which is to be understood to be a modification to the total system shown in FIG. 1) is a block diagram showing the functions of essential elements in the printer image control system. In FIG. 7, there is an image buffer 45; a printing position detecting section 51; an unwanted image area detecting section 52; and a "white" data (or "0" data) holding section 53. The print position detecting section 51 and the unwanted image area detecting section 52 are operated by the CPU 41, and the "0" data holding section 53 forms a part of the RAM 47.

When a print request command is issued, the printer control unit 2 (FIG. 1) receives it through the transceiver 43 on the network side. More specifically, the printer control unit 2 receives print data and control data through the transceiver 43. The control data includes print position data and unwanted image area data. The print position detecting section 51 detects the print position data from the control data, and determines a write address in the image buffer 45 according to the print position data thus detected. The print data received is converted into an image signal, which is stored in the above-described write address in the image buffer 45.

The unwanted image area detection section 52 detects the unwanted image area from the control data, and specifies an address in the image buffer 45 for the unwanted image area. As a result, the "0" data supplied by the "0" data holding section 53 is over-written in the unwanted image area in the image buffer 45, so that the image signals of the unwanted image area are erased. Upon completion of the erasing operation, the image signals are read out of the image buffer and supplied to the printer 1.

Figure 8:
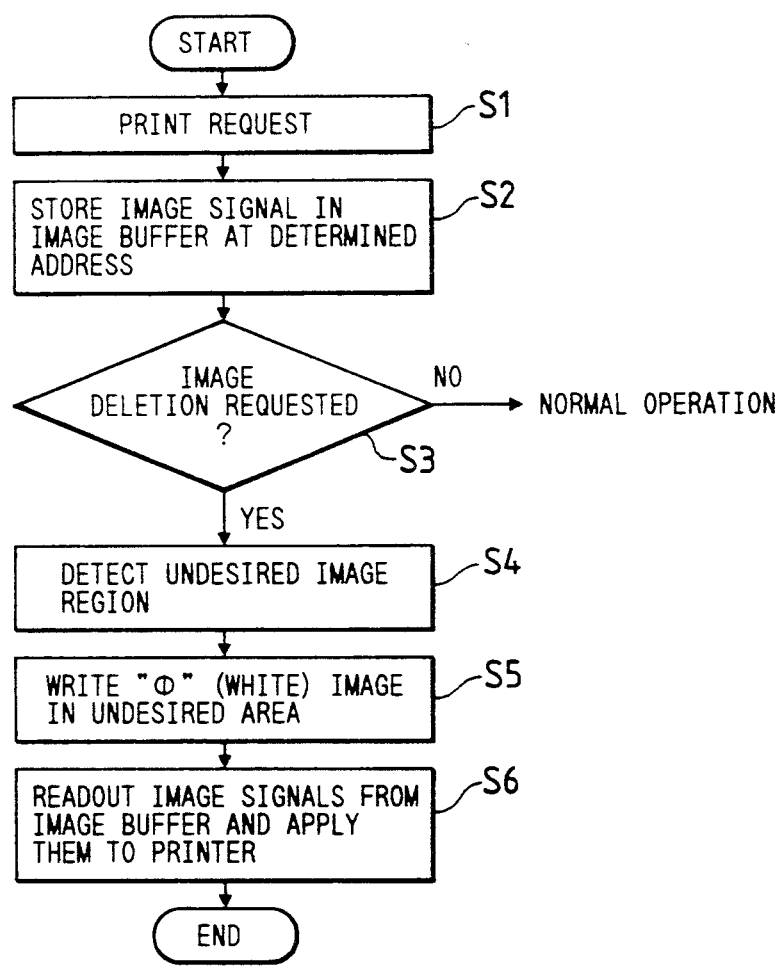
FIG. 8 is a flow chart for describing the operation of the second embodiment.

FIG. 8 is a flow chart for a description of the operation of the CPU 41 in the second embodiment. When a print request command is issued (Step S1), the CPU 41 operates to convert print data into an image signal, and then store the image signal in the address in the image buffer which is determined from the print position data (Step S2). Next, the CPU 41 determines whether or not the control data includes an image delete request (Step S3). When the result of the determination is "Yes," then the routine continues to Step S4. In Step S4, the unwanted image region is detected. Then, the "0" image is written in the unwanted image area (Step S5). When the unwanted image area has been erased, the image signals are read from the image buffer 45 and supplied to the printer (Step S6).

In this embodiment, the unwanted image can be erased merely by writing the "0" image in the unwanted image area. Hence, it is unnecessary for the operator to perform an image erasing operation at the work station.

A third embodiment of the invention will now be described. This embodiment eliminates the difficulty that control data is inputted, for instance, through the network 3 in FIG. 1 to shift the print data horizontally and/or vertically, so that only a part of the image signal is printed on the sheet. The shift request can be made, for instance, to provide a binding margin for the sheet.

When a shift request command is issued through the network 3, print data and control data including the direction of shift and the amount of shift are applied to the printer control unit 2. The print data is temporarily stored in the RAM 47. The CPU 41 operates to convert the print data into an image signal. Then, the image signal is stored in the image buffer 45. The control data for the direction of shift and the amount of shift are temporarily stored in the RAM 47.

Figure 9:
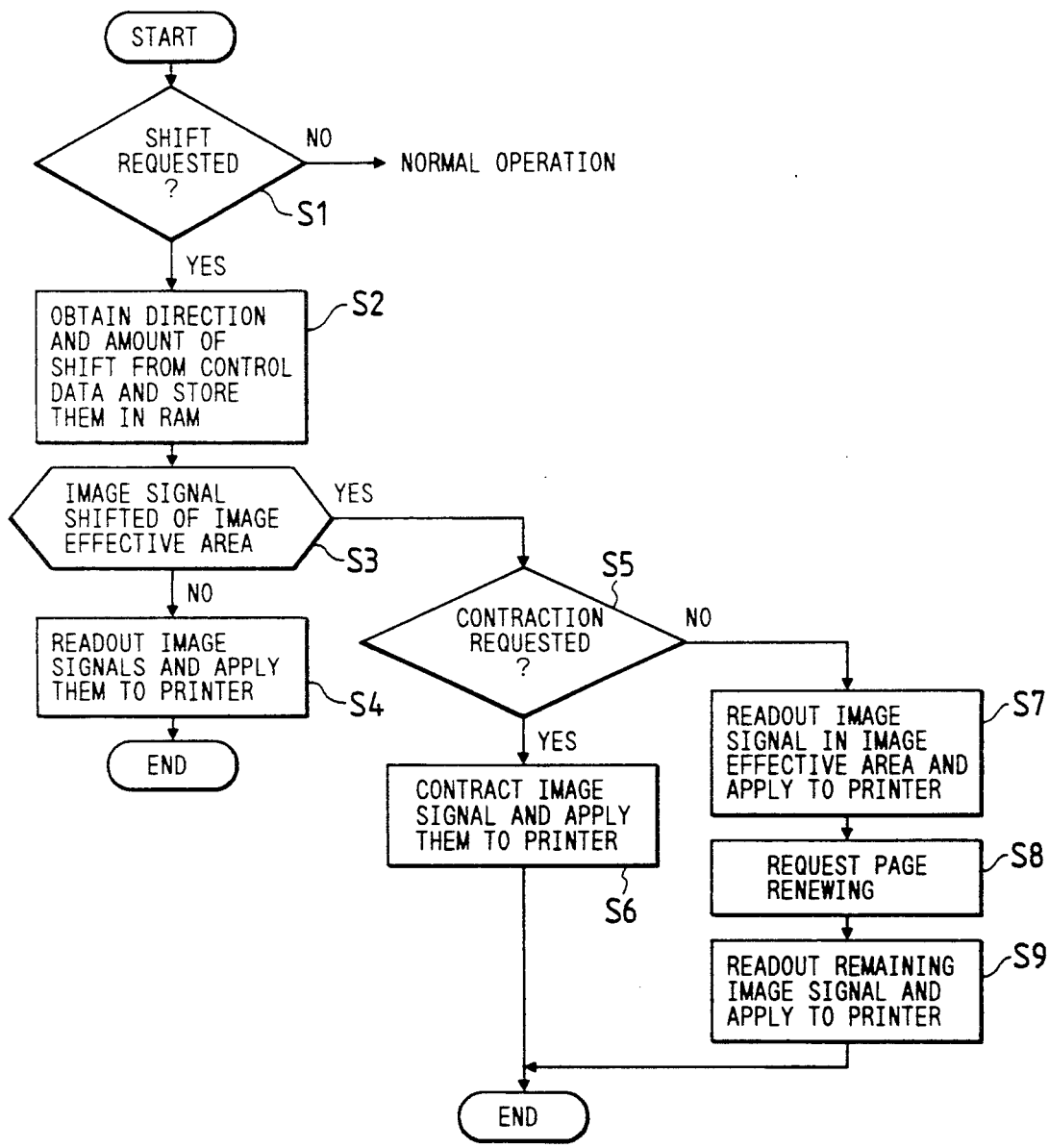
FIG. 9 is a flow chart describing the operation of a third embodiment of the present invention.

The CPU 41, controlling the direction of shift and the amount of shift in conjunction with the image effective width table (FIG. 2), operates as shown in the flow chart of FIG. 9. In this embodiment, the control data includes instruction data (such as a contraction request and a page renewing request) to deal with the image signal which is partially printed out of the image effective width.

When the printer control data supplied through the network 3 includes the request of shift ("Yes" in Step S1), the CPU 41 extracts the direction of shift and the amount of shift from the control data, and temporarily stores this data in the RAM 47 (Step S2). Thereafter, the CPU detects the size of a printing sheet set in the printer from the status data provided by the printer, and refers to the image effective width table to obtain the image effective area for that size sheet. The CPU then determines whether or not the shifted image signal falls outside of the image effective width (Step S3). That is, the CPU 41 accesses the image buffer 45 for the image signal and shifts the image signal as much as the specified amount of shift in the specified direction of shift. Then the CPU 41 determines whether or not the shifted image signal falls outside of the image effective area.

If it is determined that the image signal comes within the image effective area ("No" in Step S3), the image signal is read and applied to the printer 1.

When, on the other hand, it is determined that the image signal falls outside of the image effective area ("Yes" in Step S3), then the CPU determines whether or not a contraction request or a page renewing request has been made (Step S5). If it is determined that the contraction request has been made, Step S6 is effected. In Step S6, the image signal is contracted, and the image signal thus contracted is applied to the printer. The percentage of contraction may be either fixed or variable.

If a contraction request has not been made (Answer is No), then a page renewing request must have been made and Step S7 is effected. In Step S7, the part of the image signal which is in the image effective area is read out. Thereafter, the page renewing request is made (Step S8). The remaining part of the image signal which is out of the image effective area is read with timing data so that it is printed in place on the second sheet and applied to the printer 1 (Step S9).

Figure 10:
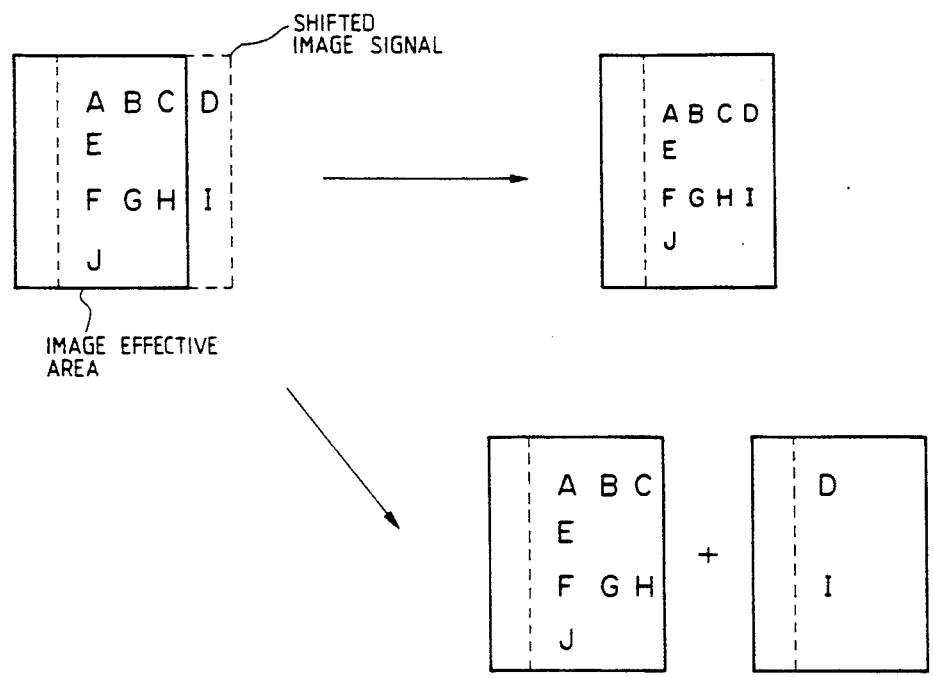
FIG. 10 is an explanatory diagram showing an example of printing using the third embodiment.

Thus, the image signal can be printed in one of the two ways shown in FIG. 10. When the image signal is contracted, the image signal is printed, in its entirety, on one page. When the page renewing request is made, the image signal is printed extending over two pages. In either case, the problem of not printing part of the image data has been eliminated.

Figure 11:
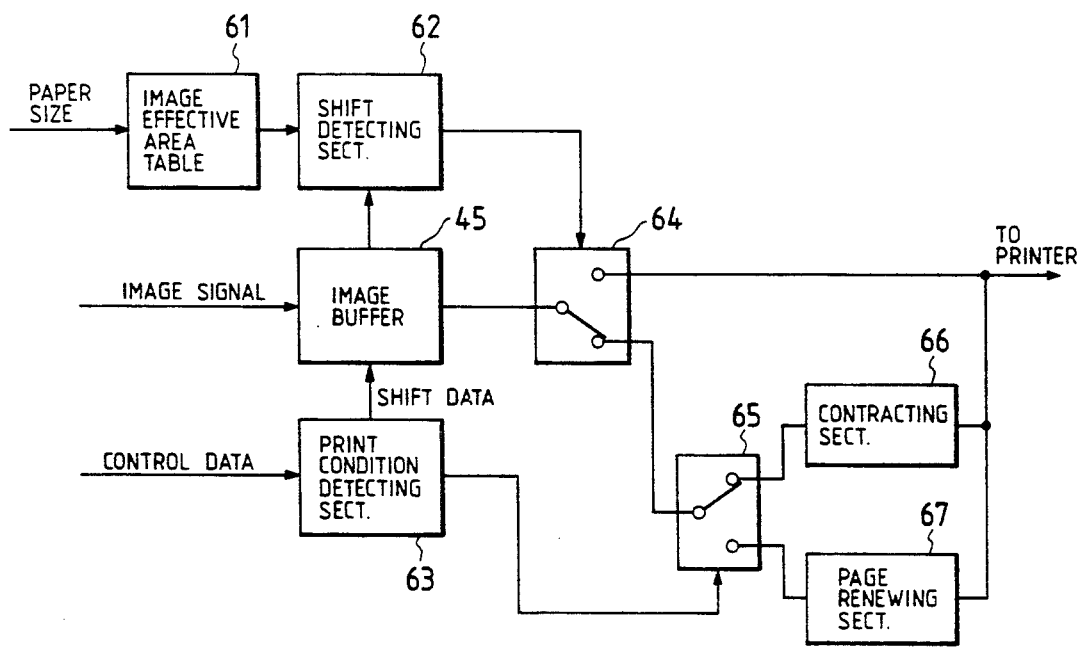
FIG. 11 is a block diagram of the third embodiment.
Figure 12:
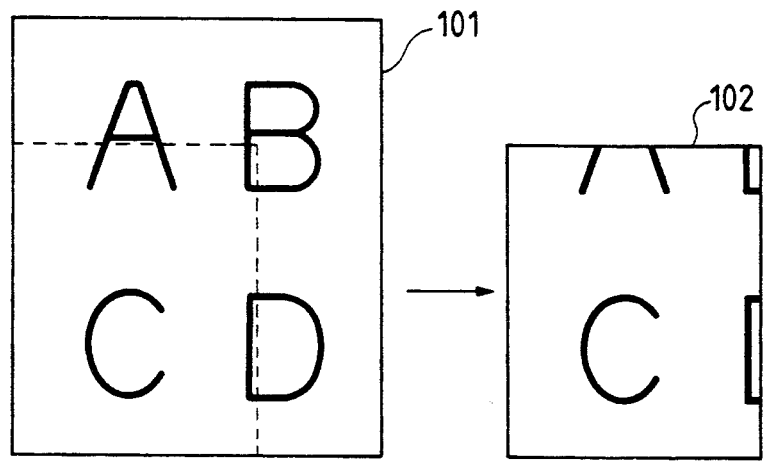
FIGS. 12, 13 and 14 are schematic diagrams for describing problems accompanying the use of conventional image data printing techniques.
Figure 13:
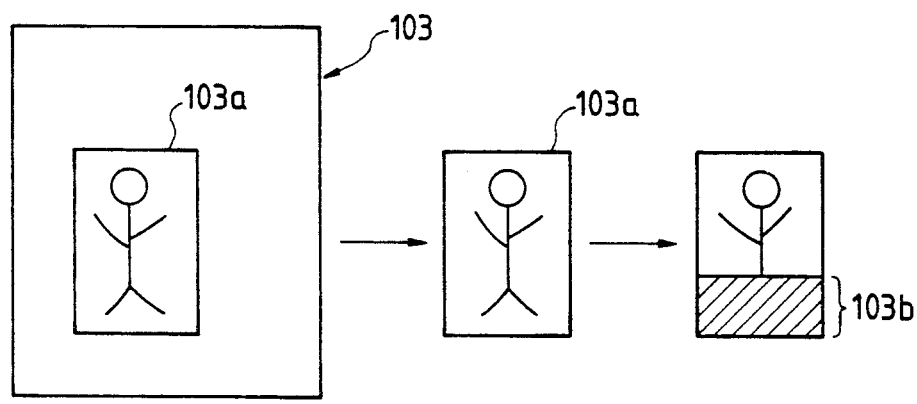
Figure 14:
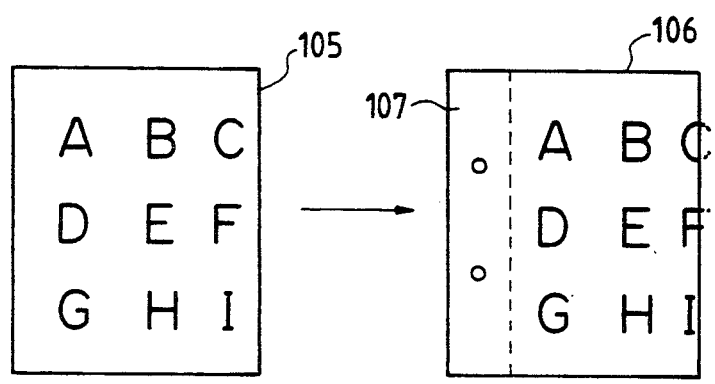

FIG. 11 is a block diagram showing the functions of elements in the printer image control system of the third embodiment of the invention. It will be understood this is a schematic representation which can be carried out by appropriate software and hardware. In FIG. 11, the system includes the image buffer 45; the image effective area table 61 (FIG. 2); a shift detecting section 62; a print condition detecting section 63; a first selecting section 64; a second selecting section 65; a contracting section 66; and an image dividing section 67.

The print condition detecting section 63 operates to detect print conditions from the control data, and to transmit shift data to the image buffer 45. The image buffer 45 shifts the image signal according to the shift data. The shift detecting section 62 determines whether or not the shifted image signal falls outside the image effective area of the sheet which is obtained from the image effective area table 61.

When it is determined that the image signal falls within the image effective area, the shift detecting section causes the first selecting section 64 to select the printer, so that the shifted image signal is transmitted to the printer. When, on the other hand, it is determined that the image signal shifted falls outside the image effective width, the first selecting section 64 is connected to the second selecting section 65.

The second selecting section 65 operates in response to a control signal provided by the print condition detecting section 63. When the print condition detecting section 63 detects the contraction request, the second selecting section 65 is operated to select the contracting section. When, on the other hand, the print condition detecting section 63 detects the page renewing request, the second selecting section 65 is operated to select the print dividing section.

The contracting section 66 operates to contract the image signal by a predetermined fixed percentage or by a variable percentage according to the amount of shift. The contracted image signal is transmitted to the printer.

The image dividing section 67 operates to output the image signal so that the part of the image shift which is in the image effective area is printed on a first page, and the remaining part is printed on the next page. Thus, with the printer image control system of the invention, image signals are printed as shown in FIG. 10.

As is apparent from the above description, the printer image control system of the invention has the following advantages:

(1) An unwanted part of an image printed on the peripheral portion of a printing sheet can be eliminated with ease. Also, an unwanted part of an image can be eliminated.

(2) When it is required to shift an image to be printed, and the image would fall partially off of a printing sheet if shifted, the part of the image which would otherwise be unprinted can be printed on the printing sheet in a contracted form or on several sheets without contraction.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A printer image control system for temporarily holding image signal data to be transmitted to a printer and for controlling the printer, said system comprising:
   means for storing predetermined image effective area data sets according to the size of print sheets;
   means for selecting an image effective area for a selected size print sheet from predetermined data sets stored in said storing means;
   means for generating image data exclusively within the image effective area; and
   means for receiving and printing data within the image effective area on the print sheet.

2. The printer image control system of claim 1, wherein the printer includes:
   a first sensor for detecting a start of a horizontal scan of the print sheet and for generating a first sensor signal; and
   a second sensor for detecting the start of the sheet supply feed and for generating a second sensor signal.

3. The printer image control system of claim 2, wherein the means for generating image data exclusively within the image effective area includes:
   an image data buffer for containing image signal data wherein said selecting means is responsive to said first and second sensor signals for transferring image signal data exclusively within the image effective area from the image data buffer to the printer.

4. The printer image control system of claim 1, further including:
   means for blocking image data which is located outside the image effective area.

5. A method of controlling the printing of an image on a print sheet in a printer using a control system, the method comprising the steps of:
   detecting a sheet size of the print sheet in the printer;
   storing a table of image effective areas according to the sheet size of the print sheet;
   selecting an appropriate image effective width and length for the sheet size from the table of image effective areas;
   generating a first read enable signal for reading in a horizontal scan direction within the image effective width;
   generating a second read enable signal for reading in a vertical feed direction within the image effective length; and
   applying image data to the image effective area only when both first and second read enable signals are generated.

6. A printer image control system for temporarily holding image signal data to be transmitted to a printer, said system comprising:
   means for storing image effective area data according to a size of print sheets;
   means for determining the size of the print sheet on which to print;
   means for selecting an image effective area from data stored in said storing means for the determined size of print sheet;

means for selecting a portion of said image signal data which is temporarily held which corresponds to a region of an image to be blanked out; and means for writing over the selected portion of said image signal data, to blank out the region of the image to be blanked out.

7. The printer image control system of claim 6, wherein said writing means includes:

means for supplying "0" data to overwrite the image data.

8. A printer image control system for temporarily holding image signal data to be transmitted to a printer and and for controlling the printer, said system comprising:

means for storing image effective area data according to sizes of print sheets;

means for determining the size of the print sheet on which to print;

means for selecting an image effective area from data stored in said storing means for the selected size of the print sheet;

means for detecting whether an area of said image signal data is partially outside the image effective area determined by said selecting means;

means for contracting said image signal data to fit within the image effective area of one print sheet;

means for dividing said image signal data to fit within the image effective area of two print sheets; and means for selecting one of said contracting and dividing means when the area of said image signal data is partially outside of said image effective area, whereby said image signal is completely printed.

9. A printer image control system for temporarily holding image signal data to be transmitted to a printer and for controlling the printer, said system comprising:

means for storing image effective area data according to a size of a print sheet;

means for determining the size of the print sheet on which to print;

means for selecting an image effective area from data stored in said storing means for the determined size of print sheet;

means for detecting whether an area of said image signal data is partially outside the image effective area selected by said selecting means; and means for contracting said image signal data to fit within the image effective area of one print sheet when said detecting means detects that the area of said image signal data is partially outside the image effective area, whereby said image signal data is completely printed.

10. A printer image control system for temporarily holding image signal data to be transmitted to a printer and for controlling the printer, said system comprising:

means for storing image effective area data according to a size of a print sheet;

means for determining the size of the print sheet on which to print;

means for selecting an image effective area from data stored by said storing means for the determined size of the print sheet;

means for detecting whether an area of said image signal data is partially outside the image effective area selected by said selecting means; and means for dividing said image signal data to fit within the image effective area of two print sheets when said detecting means detects that the area of said image signal data is partially outside the image effective area, whereby said image signal data is completely printed.

* * * * *

UNITED STATES PATENT AND TRADEMARK OFFICE
CERTIFICATE OF CORRECTION

PATENT NO. : 5,121,468
DATED      : June 09, 1992
INVENTOR(S) : Tomohiro Daino

It is certified that error appears in the above-identified patent and that said Letters Patent is hereby corrected as shown below:

Claim 8, column 9, line 13, change "and and" to --and--.

Signed and Sealed this

Twelfth Day of October, 1993

Attest:

BRUCE LEHMAN

*Attesting Officer*      *Commissioner of Patents and Trademarks*